United States Patent

[11] 3,529,526

[72] Inventors Richard Wick,
Grunwald, near Munich;
Reinhard von Sybel, Krailling;
Rainer Vesper, Munich, Germany
[21] Appl. No. 680,381
[22] Filed Nov. 3, 1967
[45] Patented Sept. 22, 1970
[73] Assignee Agfa-Gevaert Aktiengesellschaft,
Leverkusen, Germany
[32] Priority Nov. 19, 1966
[33] Germany
[31] A 26,720

[54] SYNCHRONIZING SWITCH FOR FLASH UNITS OF PHOTOGRAPHIC CAMERAS
30 Claims, 7 Drawing Figs.
[52] U.S. Cl. .................................................... 95/11.5, 95/63
[51] Int. Cl. .................................................... G03b 9/70
[50] Field of Search ........................................ 95/11, 11.5, 63

[56] References Cited
UNITED STATES PATENTS
3,134,312  5/1964  Kiper .......................... 95/11.5
3,162,108  12/1964  Knorr et al. .................. 95/11.5
3,200,721  8/1965  Kiper et al. ................... 95/11.5

Primary Examiner—Norton Ansher
Assistant Examiner—Fred L. Braun
Attorney—Michael S. Striker ABSTRACT: A combined shutter and diaphragm assembly wherein the leading setting ring moves from cocked position ahead of the trailing setting ring and wherein the blades of the shutter define an aperture whose size depends on the extent of delay with which the trailing ring moves from cocked position subsequent to movement of the leading ring. The synchronizing switch of the camera which embodies the assembly comprises two contacts one of which includes a contact element mounted on the trailing ring and the other of which includes a portion or extension which projects into the path of movement of the contact element but is slightly spaced from the latter in cocked position of the trailing ring so that the switch closes with a slight delay following movement of the trailing ring from fully cocked position. The resulting delay being sufficient to insure that the switch closes to fire an electronic flash unit at the exact moment when the aperture defined by the blades of the shutter attain a maximum size for a given intensity of scene light.

Patented Sept. 22, 1970

3,529,526

INVENTORS:
RICHARD WICK
REINHARD von SYBEL
RAINER VESPER
BY
Michael S. Striker,
Attorney

SYNCHRONIZING SWITCH FOR FLASH UNITS OF PHOTOGRAPHIC CAMERAS

BACKGROUND OF THE INVENTION

The present invention relates to photographic cameras in general, and more particularly to improvements in the construction, mounting and operation of synchronizing switches for flash units in photographic cameras. Still more particularly, the invention relates to improvements in synchronizing switches which can be utilized in photographic cameras provided with shutters which also act as diaphragms and wherein a leading setting member moves from cocked position ahead of a trailing setting member to open the diaphragm. The delay with which the trailing setting member begins to move to uncocked position determines the exposure time and the size of the aperture. As a rule, the delay is a function of changes in the intensity of scene light.

Problems arise when a camera which embodies the just outlined shutter is used with an electronic flash unit. The electronic flash unit must be fired with a certain delay following release of the shutter in order to insure that the flash unit produces artificial light at the exact moment when the aperture size has attained its maximum value for a certain light intensity or for a certain distance from the subject or scene. However, conventional synchronizing switches complete the circuit of the flash unit with a fixed delay following shutter release whereby it can happen that, when the shutter blades should define a relatively large aperture, i.e., when the trailing setting member is released for movement to uncocked position with a relatively long delay, the synchronizing switch completes the circuit of an electronic flash unit before the aperture size reaches its maximum value. On the other hand, and if the aperture size is small because the trailing setting member is allowed to return to uncocked position immediately or shortly after release of the leading setting member, the synchronizing switch is likely to fire the flash unit when the aperture size is being reduced. Thus, such conventional synchronizing switches are fully satisfactory only when the shutter blades define an aperture of medium or average size.

SUMMARY OF THE INVENTION

It is an object of our invention to provide a novel and improved synchronizing switch for use in photographic cameras of the type wherein the shutter also acts as a diaphragm and to construct and assemble the switch in such a way that it invariably closes to fire the flash unit at the exact moment when the aperture defined by the shutter blades attains a maximum value for a given setting of the shutter.

Another object of the invention is to provide a shutter for photographic cameras with a synchronizing switch which is particularly suited for firing of electronic flash units.

A further object of the invention is to provide a synchronizing switch which cannot close excepting at the time when the shutter blades define an aperture of maximum size for a given intensity of scene light.

An additional object of the invention is to provide a synchronizing switch whose parts can also perform functions which are normally performed by portions of the shutter.

A concomitant object of the invention is to provide a synchronizing switch which can be built into or combined with certain presently known types of shutters.

An ancillary object of the invention is to provide a synchronizing switch which can also serve as a means for biasing a setting member of the shutter to one of its end positions.

Still another object of the instant invention is to provide a shutter which embodies or carries the improved synchronizing switch and which is constructed and assembled in such a way that it cannot permit premature closing of the synchronizing switch and which effects automatic opening of the synchronizing switch in response to its normal operation during an exposure.

A further object of the invention is to provide a synchronizing switch which is assembled of simple, rugged and inexpensive parts, which occupies little room, and which occupies room that is normally available in a diaphragm type shutter.

Another object of the invention is to provide a synchronizing switch which can be built into a shutter wherein the blades are movable with reference to each other in response to reciprocatory, rotary and/or other movements of one or more setting members.

Our invention is embodied in a combined diaphragm and shutter assembly for photographic cameras which comprises a shutter housing, a leading setting member which preferably resembles a ring and is movable (preferably turnable) with reference to the housing between cocked and uncocked positions, and a trailing setting member which also preferably resembles a ring and is movable with reference to the housing between cocked and uncocked positions. The leading member is movable from cocked position ahead of the trailing member to open the shutter and the trailing member is movable from cocked position subsequent to the leading member with a variable delay which is preferably a function of the intensity of scene light so that the shutter closes not later than at the time when the trailing member reaches its uncocked position. The improved synchronizing switch comprises a first contact including a contact element carried by the trailing member and resembling a pin, lug, post, U-shaped body or the like, and a second contact carried by the housing and including a portion or extension which is located in the path of movement of the contact element when the trailing member moves from cocked toward uncocked position. The extension is slightly spaced from the contact element in the fully cocked position of the trailing member to allow for acceleration of this trailing member under the bias of a spring before the synchronizing switch closes in response to actual engagement between the contact element and the extension. The operation of the assembly is such that the blades whose movements are controlled by the setting members define an aperture of maximum size for a given intensity of scene light shortly after the trailing member leaves its cocked position. This insures that a flash unit whose terminals are connected with the two contacts of the synchronizing switch is fired at the exact moment when the aperture defined by the shutter blades reaches its maximum value. The terminals of the flash unit can be connected to a pair of fixed terminals on the shutter housing. Each of these fixed terminals forms part of one of the contacts.

The extension of the second contact may be elastic so that it can yield in response to engagement by the contact element of the first contact, or the extension can be pivotably or slidably mounted on the housing to be withdrawn from the path of movement of the contact element during cocking of the trailing member to thus prevent untimely closing of the synchronizing switch. If the extension is elastic, it may carry an insulator (or an insulator may be provided on the trailing member) to prevent closing of the synchronizing switch when the trailing member moves toward cocked position.

The novel features which are considered as characteristic of the invention are set forth in particular in the appended claims. The improved synchronizing switch itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
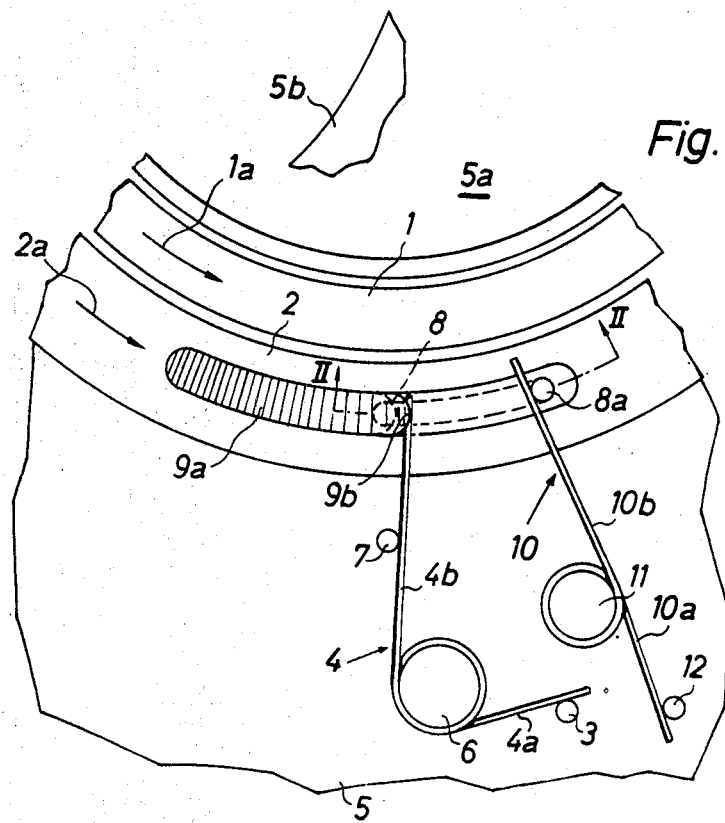
FIG. 1 is a fragmentary front elevational view of a combined shutter and diaphragm assembly provided with a synchronizing switch which embodies one form of our invention, the setting members being shown in cocked positions.
Figure 2:
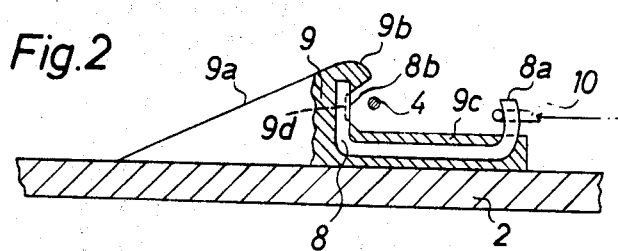
FIG. 2 is a sectional view as seen in the direction of arrows from the line II—II of FIG. 1.

Referring first to FIGS. 1 and 2, there is shown a combined shutter and diaphragm assembly for use in a photographic camera, for example, in a still camera with automatic exposure control. The shutter comprises a housing 5 defining an opening 5a which is normally closed by two blades 5b (only one shown). Each blade 5b is pivotally connected to each of two rotary setting members here shown as rings 1 and 2. The ring 1 is the leading ring and the ring 2 is the trailing ring. The arrangement is such that the blades 5b close the opening 5a when the rings 1, 2 are held in uncocked positions by suitable return springs, as well as when the rings 1 and 2 move together from uncocked to cocked positions. During cocking, the rings 1 and 2 are rotated about the optical axis in a clockwise direction, as viewed in FIG. 1, and the blades 5b then prevent entry of light to an unexposed film frame behind the opening 5a. When the shutter release (not shown) is actuated to release the leading ring 1, the latter advances in a counterclockwise direction (arrow 1a) at a speed which is determined by a suitable retard mechanism of known design so that it takes a predetermined amount of time before the leading ring 1 returns to uncocked position. The trailing ring 2 is held in cocked position by a delay mechanism (not shown) which selects the delay as a function of the intensity of scene light whereby the blades 5b expose a portion of or the entire opening 5a, depending on the extent of delay with which the trailing ring 2 follows the leading ring 1 to uncocked position. The exposure control which regulates the operation of delay mechanism for the trailing ring 2 is well known from the art of photographic cameras and the details of its construction and operation form no part of the present invention. The same applies for the heretofore described parts of the shutter. If the delay with which the trailing ring 2 is released for movement to uncocked position subsequent to release of the leading ring 1 is very short, the trailing ring 2 "catches up" with the leading ring 1 before the blades 5b can expose the entire opening 5a, i.e., the shutter then defines a relatively small diaphragm aperture and the exposure time is relatively short. If the delay with which the trailing ring is released by the delay mechanism is rather long (namely, when the intensity of scene light is weak), the leading ring 1 can reach its uncocked position before the trailing ring 2 begins to move to uncocked position whereby the blades 5b expose the entire opening 5a or a substantial part of the opening 5a so that the shutter provides a long exposure time and a diaphragm aperture of maximum size. The movement of trailing ring 2 is not retarded once the aforementioned delay mechanism releases this trailing ring for movement to uncocked position; therefore, the trailing ring can catch up with the leading ring if the delay is relatively short. As a rule, the rings 1 and 2 are biased to uncocked positions by a pair of helical or otherwise configured return springs which store energy when the rings are cocked by means of a lever or by the shutter release.

Regardless of the exact exposure time and/or aperture size, the maximum aperture for a given intensity of scene light is achieved shortly after the trailing ring 2 is released for movement to uncocked position, namely, when the aforementioned return spring accelerates the trailing ring 2 to full speed. This is due to the fact that, as a rule, the leading ring 1 is still in motion toward uncocked position when the trailing ring 2 is released. The size of the aperture defined by the blades 5b begins to decrease only when the speed of the trailing ring 2 exceeds the speed of the leading ring 1 or when the leading ring is idle while the trailing ring moves toward uncocked position. If the camera embodies an electronic flash unit or is to be used with a detachable electronic flash unit, the latter should be fired at the exact moment when the aperture size attains a maximum value for a given intensity of scene light, i.e., the flash unit should be fired as soon as the trailing ring 2 is accelerated to full speed during movement from cocked toward uncocked position or immediately before the trailing ring is accelerated to full speed. In accordance with our present invention, such accurately determined firing of the flash unit can be achieved by resorting to a novel synchronizing switch which can complete the electric circuit of the flash unit at an accurately selected time, namely, always when the blades 5b define an aperture of maximum size for a given intensity of scene light.

The synchronizing switch of FIGS. 1 and 2 comprises two contacts the first of which includes a first terminal 3 which is fixed to the shutter housing 5 and is permanently engaged by one leg 4a of a torsion spring 4 which also forms part of the first contact and is coiled around a supporting post 6 carried by the housing 5. The other leg 4b of the torsion spring 4 constitutes an extension of the first contact and bears against a stop pin 7 which is mounted on the housing 5. The spring 4 and the terminal 3 of the first contact are electrically insulated from the housing 5, and the stop pin 7 also consists of or is surrounded by insulating material. The second contact of the synchronizing switch includes a substantially U-shaped contact element or conductor element 8 of metallic material which is installed on the trailing ring 2. The arrangement is such that the longer leg 4b of the torsion spring 4 is slightly spaced from a bare portion or flange 8b of the contact element 8 when the longer leg 4b bears against the stop pin 7 and the trailing ring 2 assumes its fully cocked position. The tip of the longer leg 4b of the torsion spring 4 then extends into the path of movement of the contact element 8, namely, such tip is engaged by the flange or bare portion 8b shortly after the trailing ring 2 begins to move in the direction indicated by arrow 2a to leave its cocked position and to close the shutter. The contact element 8 is embedded in a deflecting cam or carrier 9 of insulating material which is mounted on the trailing ring 2 and has a camming portion or ramp 9a as well as a rounded crest 9b which is located at the topmost end of the ramp 9a, as viewed in FIG. 2. The contact element 8 of the second contact of the synchronizing switch engages with a second current-conducting torsion spring 10 which is coiled around a supporting post 11 on the shutter housing 5 and whose shorter leg 10a bears against a terminal 12 which is also mounted on the shutter housing 5. The electric circuit of a flash unit whose terminals are connected with the fixed terminals 3 and 12 is completed when the longer leg 10b of the torsion spring 10 bears against the bare portion or flange 8a of the contact element 8 and when the other bare portion or flange 8b of the contact element 8 engages the longer leg 4b of the torsion spring 4. This takes place shortly after the trailing ring 2 leaves the cocked position of FIG. 1 or 2 and begins to turn about the optical axis in the direction indicated by arrow 2a. The carrier or cam 9 has a window 9d below the crest 9b which exposes only a small part of the flange 8b, i.e., just enough to allow for engagement of the exposed part of the flange 8b with the longer leg 4b of the torsion spring 4 when the trailing ring 2 moves away from cocked position. The numeral 9c denotes that part of the carrier 9 which surrounds and grips the web of the contact element 8.

The operation is as follows:

The terminals of an electronic flash unit which is built into, installed on or otherwise associated with the camera which embodies the shutter of FIGS. 1 and 2 are connected with the fixed terminals 3 and 12 on the shutter housing 5. The rings 1 and 2 are moved to cocked positions by the aforementioned cocking lever or by the release trigger. When the trigger thereupon releases the leading ring 1 for movement from cocked position (arrow 1a), the blades 5b expose a progressively increasing portion of the opening 5a while the ring 1 travels toward uncocked position under the bias of its return spring but at a speed which is determined by the aforementioned retard mechanism. The release of trailing ring 2 is delayed as a function of the intensity of scene light. As soon as the ring 2 is released, it is rapidly accelerated by its return spring to full speed because its movement to uncocked position is not braked or retarded. The contact element 8 travels with the trailing ring 2 in the direction indicated by arrow 2a and the exposed part of its flange 8b (in the window 9d of the deflecting cam 9) engages the longer leg 4b of the torsion spring 4 at the exact time when or shortly before the ring 2 is accelerated to full speed. The flange 8b engages the longer leg 4b of the torsion spring 4 at a time when the blades 5b define an aperture of maximum size for the momentarily prevailing intensity of scene light, irrespective of whether the size of the aperture is large or small. The flash unit is fired without fail when the blades 5b define an aperture of maximum size to make sure that the operation of the flash unit is properly synchronized with operation of the combined shutter and diaphragm assembly. The length of time during which the synchronizing switch remains closed depends on the interval during which the longer leg 4b of the spring 4 remains in engagement with the flange 8b while the trailing ring 2 continues to move toward uncocked position. The flange 8b flexes the leg 4b of the spring 4 and ultimately moves past the tip of the leg 4b to open the synchronizing switch.

During cocking, the rings 1 and 2 move as a unit from uncocked toward cocked positions by rotating in a clockwise direction, as viewed in FIG. 1. The blades 5b then conceal the opening 5a because there is no relative movement between the rings 1 and 2. During such clockwise rotation of the trailing ring 2, the tip of the longer leg 4b of the torsion spring 4 is caused to slide along the ramp 9a of the deflecting cam 9 and thereupon slides over the rounded crest 9b to return into registry with the window 9d but without engaging the exposed part of the flange 8b. This is due to the action of the stop pin 7 which prevents leftward flexing of the tip of the longer leg 4b when the crest 9b moves beyond this tip. Thus, there is no completion of the flash circuit when the rings 1 and 2 travel toward cocked positions. In the embodiment of FIGS. 1 and 2, the spring 10 is in permanent current-conducting engagement with the terminal 12 and flange 8a. This spring serves as a connector between the parts 8, 12 and also as a means for biasing the trailing ring 2 to uncocked position. The bias of spring 10 determines the rate at which the ring 2 is accelerated to full speed during movement toward uncocked position (arrow 2a).

Figure 3:
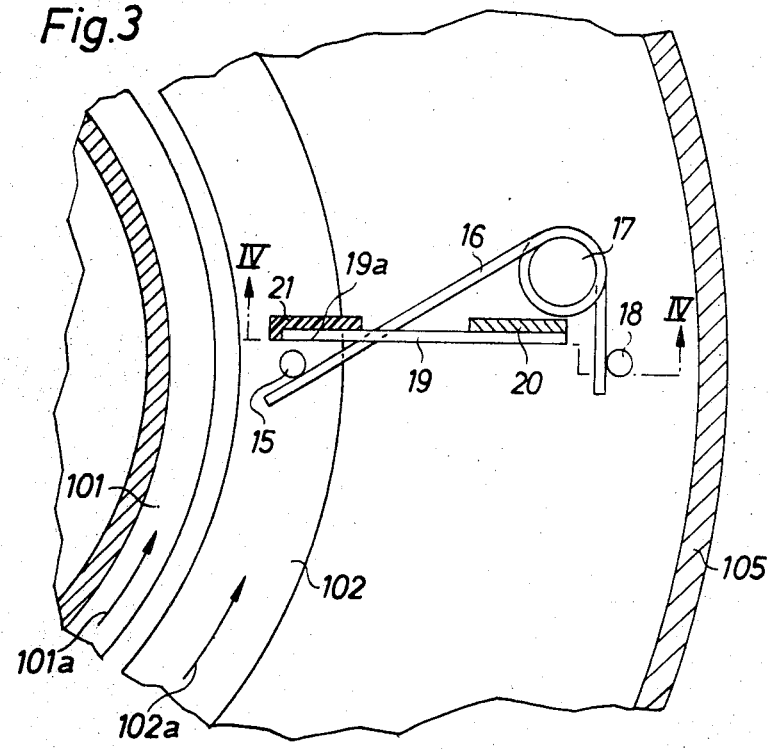
FIG. 3 is a fragmentary partly front elevational and partly sectional view of a second assembly which comprises a modified synchronizing switch.
Figure 4:
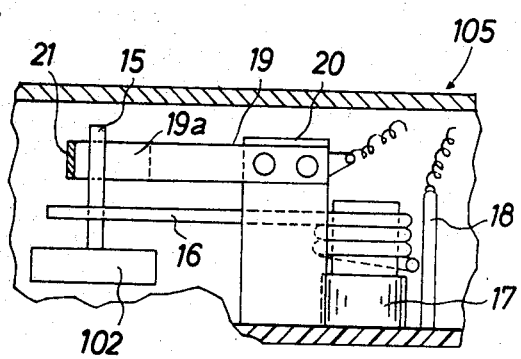
FIG. 4 is a sectional view as seen in the direction of arrows from the line IV—IV of FIG. 3.

FIGS. 3 and 4 show a combined shutter and diaphragm assembly including a shutter housing 105, a leading setting member or ring 101 and a trailing setting member or ring 102. The blades which are actuated by the rings 101, 102 are not shown for the sake of clarity. The trailing ring 102 carries a contact element or conductor element 15 which resembles a pin and is engaged by the longer leg of a torsion spring 16 coiled around a supporting post 17 on the shutter housing 105 and having a shorter leg which bears against a first fixed terminal 18 on the housing 105. The spring 16 and terminal 18 are insulated from the shutter housing. The parts 15, 16, 18 together constitute the first contact of the synchronizing switch and the second contact of this switch includes a resilient element in the form of a leaf spring 19 one end of which is affixed to an insulator 20 on the shutter housing 105. The current-conducting end portion 19a or extension of the leaf spring 19 projects into the path of movement of the contact element 15 when the trailing ring 102 leaves the illustrated cocked position and begins to move in the direction indicated by arrow 102a. That side of the extension 19a which faces away from the contact element 15 is surrounded by an insulator 21.

When the user wishes to make an exposure with flash, the terminals of the electronic flash unit are connected with the terminal 18 and with the right-hand portion of the leaf spring 19. The rings 101, 102 are moved to cocked positions by turning in a clockwise direction as viewed in FIG. 3 to assume the illustrated positions. The shutter release then releases the leading ring 101 which moves in the direction indicated by arrow 101a at a speed which is determined by the retard mechanism. The trailing ring 102 is released with a delay which is a function of the intensity of scene light and is rapidly accelerated to full speed. At the time when the aperture defined by the shutter blades assumes its maximum value for the given intensity of scene light, the contact element 15 engages the exposed or bare portion of the extension 19a to close the synchronizing switch and to thus cause firing of the flash unit. As the trailing ring 102 continues to turn in a counterclockwise direction, the contact element 15 flexes and ultimately moves past the extension 19a of the leaf spring 19 to open the synchronizing switch.

When the rings 101, 102 are cocked, they rotate in a clockwise direction and the contact element 15 engages the insulator 21 to thereby flex the extension 19a of the leaf spring 19 in a counterclockwise direction. The synchronizing switch remains open because the contact element 15 is held away from the bare portion of the extension 19a. It will be noted that the insulator 21 coats the tip of the extension 19a to prevent completion of the flash circuit during cocking of the rings 101, 102.

The pin-shaped contact element 15 can be replaced by a lug, cam, rod or an otherwise configured current-conducting part. The torsion spring 16 may serve as the sole means for permanently biasing the trailing ring 102 toward uncocked position (arrow 102a).

Figure 5:
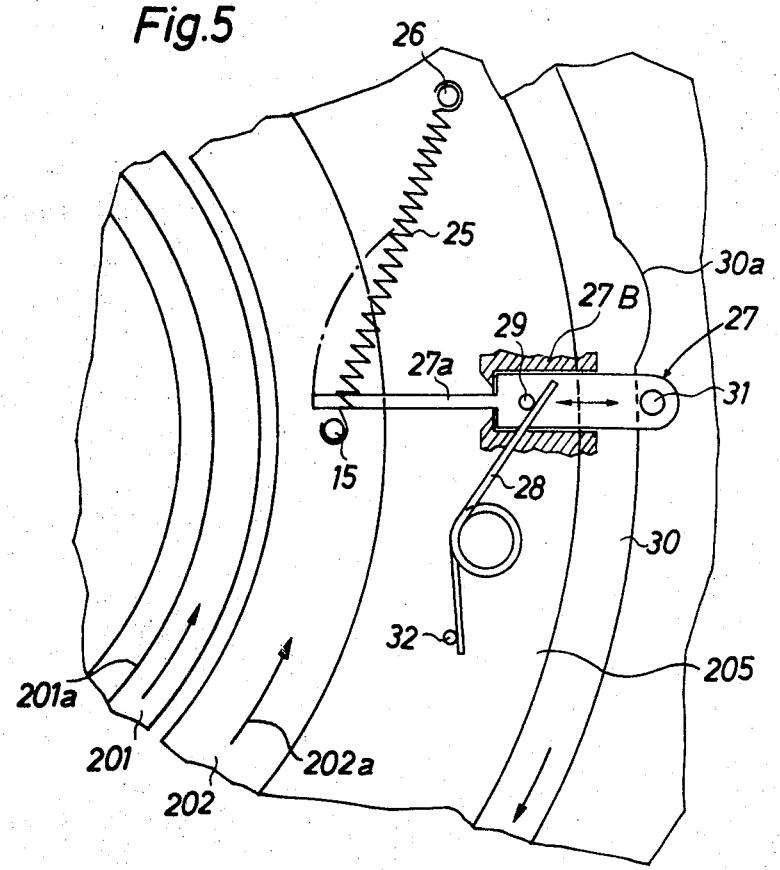
FIG. 5 is a fragmentary partly front elevational and partly sectional view of a third assembly provided with a synchronizing switch one contact of which includes a slide.

FIG. 5 shows a third combined shutter and diaphragm assembly including a leading ring 201, a trailing ring 202 and a shutter housing 205. The synchronizing switch includes two contacts one of which comprises a contact element or conductor element in the form of a pin 15 affixed to the trailing ring 202, a helical spring 25 and a terminal 26 on the shutter housing 205. The spring 25 conducts current between the contact element 15 and terminal 26 and biases the ring 202 toward uncocked position (arrow 202a). The second contact of the synchronizing switch includes a metallic slide 27 which is insulated from the shutter housing 205 and is reciprocable in ways 27B consisting of insulating material and carried by the housing 205. The second contact further includes a torsion spring 28 which bears against a projection 29 of the slide 27 to bias the latter in a direction to the left, as viewed in FIG. 5. One leg of the spring 28 bears against a terminal 32 on the shutter housing 205.

The means for automatically retracting the left-hand end portion or extension 27a of the slide 27 from the path of movement of the contact element 15 when the trailing ring 202 is moved back to the cocked position of FIG. 5 by turning clockwise comprises a cocking ring 30 which is rotatable in the housing 205 and carries a cam 30a cooperating with a pin-shaped follower 31 on the slide 27. The latter is reciprocable substantially radially of the rings 201, 202 and 30. The manner in which the cocking ring 30 is operatively connected with and can move the rings 201, 202 to cocked positions is known and is not shown in FIG. 5.

When the user wishes to make an exposure with flash, the terminals of the flash unit are connected with the terminals 26, 32 and the cocking ring 30 is turned to rotate the rings 201, 202 in a clockwise direction until these rings assume the illustrated positions. The shutter release is then depressed or otherwise moved to release the leading ring 201 which begins to rotate in the direction indicated by arrow 201a at the speed determined by the retard mechanism. The ring 202 is released with a delay which is a function of the intensity of scene light and then turns in the direction indicated by arrow 202a to move its contact element 15 against the extension 27a of the slide 27 whereby the synchronizing switch closes because a current can flow from the terminal 26 through spring 25, contact element 15, slide 27, projection 29 and leaf spring 28 to the terminal 32. The distance between the extension 27a of the slide 27 and contact element 15 is just sufficient to allow for full acceleration of the trailing ring 202 under the action of spring 25 prior to closing of the synchronizing switch. The extension 27a of the slide 27 is flexible so that it yields to the pressure transmitted by contact element 15 and permits opening of the synchronizing switch in response to a predetermined angular displacement of trailing ring 202 from cocked position.

During cocking of the rings 201, 202, the cocking ring 30 moves its cam 30a against the follower 31 and retracts the slide 27 against the opposition of the torsion spring 28 before the contact element 15 can reach the extension 27a. This prevents closing of the synchronizing switch during cocking. The cam 30a moves past the follower 31 and permits the torsion spring 28 to return the extension 27a of the slide 27 to the illustrated position when the ring 202 reaches its fully cocked position. The extension 27a is then located in the path of movement of the contact element 15 but is slightly spaced therefrom to prevent closing of the synchronizing switch prior to full acceleration of the ring 202 during movement from cocked position.

Figure 6:
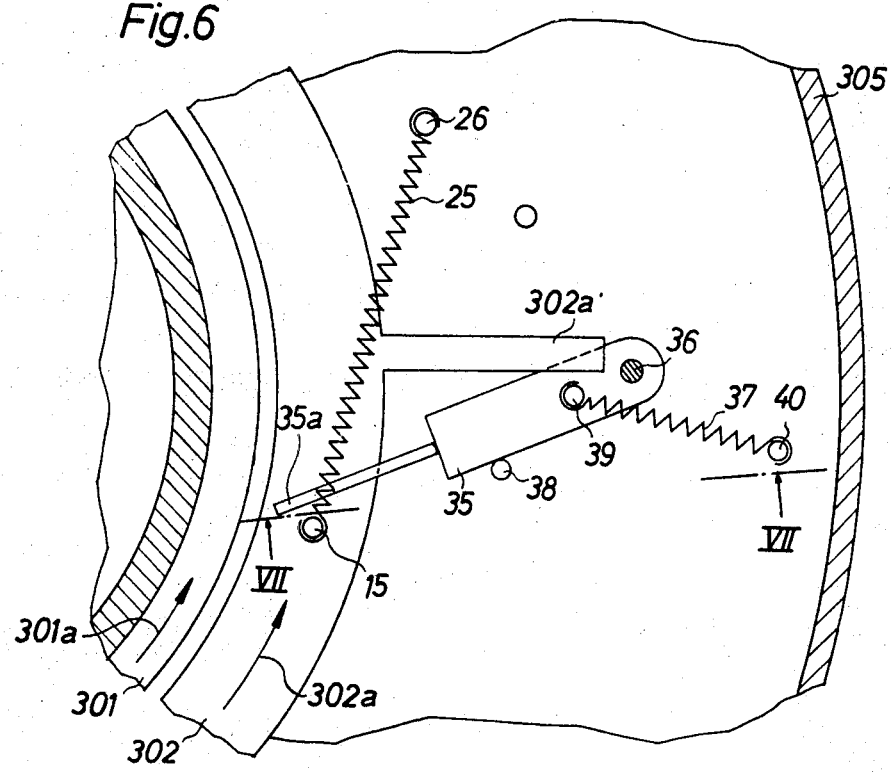
FIG. 6 is a similar view of a fourth assembly wherein one contact of the synchronizing switch includes a rockable lever.
Figure 7:
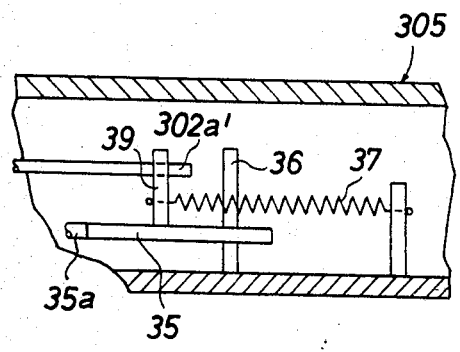
FIG. 7 is a sectional view as seen in the direction of arrows from the line VII—VII of FIG. 6.

Referring finally to FIGS. 6 and 7, there is shown a fourth combined shutter and diaphragm assembly including a shutter housing 305, a leading ring 301 which moves in the direction indicated by arrow 301a during rotation from cocked toward uncocked position, and a trailing ring 302 which comprises a radially outwardly extending arm 302a' and turns in the direction indicated by arrow 302a during movement from cocked toward uncocked position. The first contact of the synchronizing switch is identical with the first contact of the switch shown in FIG. 5, i.e., it comprises a pin-shaped contact element or conductor element 15 on the trailing ring 302, a terminal 26 affixed to the housing 305, and a helical spring 25 which conducts current between the element 15 and terminal 25 and biases the ring 302 toward uncocked position. The second contact comprises a pivotable member in the form of a lever 35 having a rigid portion or extension 35a and turnable about the axis of a pivot pin 36 affixed to the housing 305. The pivot pin 36 is insulated from the shutter housing and/or from the lever 35. The latter is biased by a helical spring 37 which operates between a pin-shaped retainer 39 on the lever and a terminal 40 affixed to the shutter housing 305. The spring 37 biases the lever 35 against a stop pin 38 on the shutter housing; the extension 35a of the lever 35 then projects into the path of movement of the contact element 15 but is slightly spaced therefrom for reasons which were explained in connection with the previously described embodiments. The spring 37 is a so-called over-the-center spring and can bias the lever 35 in two directions.

When the shutter is fully cocked, the parts assume the positions shown in FIGS. 6 and 7. The extension 35a is slightly spaced from the contact element 15 and the spring 37 urges the lever 35 against the stop pin 38. The operator depressses the shutter release whereby the leading ring 301 moves in the direction indicated by arrow 301a at the speed determined by the retard mechanism. The ring 302 is released with a certain delay and then turns in the direction indicated by arrow 302a. When the ring 302 is accelerated to full speed, i.e., when the size of the aperture is largest, the contact element 15 engages the extension 35a of the lever 35 to close the synchronizing switch. Current then flows between the terminals 26 and 40 which are connected to the terminals of a suitable flash unit, not shown. The unit produces a flash and the synchronizing switch opens automatically in response to pivoting of the lever 35 about the pivot pin 36 due to continued engagement between the contact element 15 and extension 35a. The spring 37 snaps over and turns the lever 35 in a clockwise direction to open the synchronizing switch when the axes of the terminal 40, pivot pin 36 and retainer 39 are located in a common plane.

The arm 302a' of the trailing ring 302 serves the same purpose as the cam 30a of the cocking ring 30 shown in FIG. 5. The arm 302a' engages the retainer 39 of the lever 35 and turns the latter in a counterclockwise direction during cocking of the rings 301, 302 so that the spring 37 can snap over again and returns the lever 35 into abutment with the stop 38. The extension 35a is then spaced from the contact element 15 until after the ring 302 is released again and is accelerated to full speed.

All of the four illustrated embodiments exhibit the common feature of having a synchronizing switch one contact of which includes a contact element which is carried by and moves with the trailing setting member and the other contact of which includes a portion or extension slightly spaced from the contact element of the one contact when the trailing setting member is held in cocked position. The contact element is spaced from the extension in such a way that it requires at least some acceleration of the trailing setting member prior to closing of the synchronizing switch.

It is clear that the improved synchronizing switch can be modified in a number of ways without departing from the spirit of our invention. For example, and referring again to FIG. 5, the contact element 15 could be provided with an inclined cam face adapted to push the extension 27a of the slide 27 against the opposition of the spring 28 when the trailing ring 202 travels in the direction indicated by arrow 202a, i.e., the extension 27a can consist of rigid non-elastic material because the slide 27 need not undergo deformation in order to permit movement of the contact element 15 past the extension 27a. It is also clear that the one and/or the other setting member need not turn but can be moved back and forth between cocked and uncocked positions. Furthermore, the invention can be embodied in shutters wherein one blade moves ahead of the other blade to open the shutter and the other blade follows to close the shutter. All such modifications will be readily understood by persons skilled in this art without necessitating additional illustrations.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the claims.

We claim:

1. In a combined diaphragm and shutter assembly for photographic cameras, a combination comprising a shutter housing; a leading setting member movable with reference to said housing between cocked and uncocked positions; a trailing setting member movable with reference to said housing between cocked and uncocked positions, said leading member being movable from cocked position ahead of said trailing member to open the shutter and said trailing member being movable from cocked position subsequent to said leading member with a variable delay to account for the intensity of scene light and to close the shutter; and a synchronizing switch comprising a first electric contact including a contact element carried by and movable with said trailing member, and a second electric contact carried by said housing and including a portion located in the path of movement of said contact element when said trailing member moves toward uncocked position, said contact element being slightly spaced from said portion of the second contact in the cocked position of said trailing member so that said contact element movable with said trailing member and said second electric contact carried by said housing will engage at a time when said trailing member and said leading member move substantially at the same speed.

2. A combination as defined in claim 1, wherein said portion of the second contact is movable by said contact element from a first position in which it is located in said path to a second position in which it permits the contact element to move past and to be disengaged from said second contact to thereby open said switch in response to continued movement of said trailing member toward uncocked position.

3. A combination as defined in claim 2, wherein said portion of said second contatct is elastic and undergoes deformation during engagement with said contact element while said trailing member moves toward uncocked position.

4. A combination as defined in claim 3, further comprising means for removing said portion of said second contact from the path of movement of said trailing member toward cocked position.

5. A combination as defined in claim 4, wherein said removing means comprises a deflecting cam consisting of insulating material and having a ramp located ahead of said contact element as considered in the direction of movement of said trailing member toward cocked position to deflect said portion of the second contact during such movement of the trailing member.

6. A combination as defined in claim 5, wherein said contact element is partially embedded in said cam and comprises two bare portions one of which is engaged by said portion of the second contact during movement of said trailing member toward uncocked position, said first contact further comprising a terminal mounted on said housing and current-conducting connection between said terminal and the other bare portion of said contact element.

7. A combination as defined in claim 6, wherein said current-conducting connection comprises a spring.

8. A combination as defined in claim 6, wherein said contact element is substantially U-shaped and said bare portions constitute the flanges of said contact element.

9. A combination as defined in claim 6, wherein said cam further comprises a crest adjacent to the highest point of said ramp and overlying said one bare portion of the contact element.

10. A combination as defined in claim 6, wherein said contact element is substantially U-shaped and comprises a pair of flanges constituting said bare portions and a web intermediate said flanges, said cam comprising a portion which surrounds said web.

11. A combination as defined in claim 1, wherein said first contact further comprises a terminal provided on said housing and a current-conducting connection between said contact element and said terminal.

12. A combination as defined in claim 11, wherein said contact element is a pin and said connection comprises a spring.

13. A combination as defined in claim 11, wherein said connection is a torsion spring.

14. A combination as defined in claim 11, wherein said connection is a helical spring.

15. A combination as defined in claim 11, wherein said connection comprises a spring arranged to bias said trailing member toward uncocked position.

16. A combination as defined in claim 15, wherein said spring biases said trailing member solely through the intermediary of said contact element.

17. A combination as defined in claim 3, wherein said second contact consists of a spring having a second portion affixed to said housing.

18. A combination as defined in claim 17, further comprising an insulator provided on said first mentioned portion of said spring to prevent closing of said switch during movement of said trailing member toward cocked position.

19. A combination as defined in claim 18, wherein said insulator surrounds that side of said first mentioned portion of said spring which faces away from said contact element in the cocked position of said trailing member.

20. A combination as defined in claim 1, wherein said second contact further comprises a slide having an elastically deformable extension constitituting said portion thereof, and further comprising ways provided on said housing for said slide and means for displacing said slide in said ways to withdraw said extension from the path of movement of said contact element during movement of said trailing member toward cocked position to thus prevent closing of said switch.

21. A combination as defined in claim 20, wherein said displacing means comprises a cocking member for said trailing member, a cam provided on said cocking member, and a follower provided on said slide and extending into the path of movement of said cam during cocking of said trailing member.

22. A combination as defined in claim 21, further comprising means for permanently biasing said extension into the path of movement of said contact element.

23. A combination as defined in claim 20, wherein said extension is flexed by said contact element during movement of said trailing member toward uncocked position and is ultimately moved away from said path to permit continued movement of said contact element with said trailing member and to thereby open said switch.

24. A combination as defined in claim 1, wherein said second contact comprises a member pivotable about a fixed axis defined by said housing and having an extension which constitutes said portion of the second contact.

25. A combination as defined in claim 24, further comprising resilient means for biasing said extension into the path of movement of said contact element in cocked position of said trailing member.

26. A combination as defined in claim 25, wherein said resilient means is arranged to bias said pivotable member in one direction when the trailing member assumes said cocked position and in another direction when the extension is pivoted by said contact element through a predetermined angle in response to movement of said trailing member toward uncocked position whereby the switch opens when the bias of said resilient means upon said pivotable member changes.

27. A combination as defined in claim 26, further comprising means for pivoting said member in said one direction in response to cocking of said trailing member.

28. A combination as defined in claim 27, wherein said pivoting means comprises an arm provided on said trailing member.

29. A combination as defined in claim 1, wherein said setting members are rotatable with reference to said housing about a common axis.

30. A combination as defined in claim 1, wherein each of said contacts further comprises a terminal fixedly carried by said housing.